UNITED STATES PATENT OFFICE.

DELL F. HARBAUGH, OF CHICAGO, ILLINOIS.

METHOD OF RECOVERING METALS FROM THEIR ORES.

1,306,480.     Specification of Letters Patent.     Patented June 10, 1919.

No Drawing.     Application filed July 5, 1918. Serial No. 243,258.

*To all whom it may concern:*

Be it known that I, DELL F. HARBAUGH, a citizen of the United States, and a resident of the city of Chicago, county of Cook, and State of Illinois, have invented certain new and useful Improvements in Methods of Recovering Metals from Their Ores, of which the following is a specification.

My invention relates to improvements in methods of recovering metals from their ores, and has for its object the provision of an improved method of this character especially adapted for the recovery of metals, and particularly lead, zinc or copper from their oxids as they occur in ores, which is highly efficient in use.

The preferred method of the procedure consists in first fusing a quantity of the substantially pure metal or metals with a quantity of sodium carbonate, or its equivalent, sufficient to cover the same. The product thus formed is then fused with a suitable quantity of the ore to be treated and formed into an anode. The anode thus formed is then employed as such in a suitable electrolyte in an electrolytic process for the recovery of the metal from the ore or ores, by passing a suitable electric current therethrough in the usual manner.

From ten to ninety-five per cent. of the pure metal may be used with the sodium carbonate, and from five to ninety per cent. of the oxid or oxids of the metal or metals may be used with the mixture thus obtained. The process is especially adapted for use in the recovery of lead, zinc and copper, or mixtures of the same, and will be found to be highly efficient in use. The electrolyte which may be used may be one of the usual or desired electrolytes for the metal or metals to be treated.

Borax, or a combination or borax and sodium carbonate of equal or unequal proportions may be employed as the equivalent of the sodium carbonate. The equivalents of the sodium carbonate for the purpose of the invention will not be found in their chemical nature, but in their functional efficiency.

While I have set forth the preferred method of procedure and proportions of ingredients, these may be varied without departing from the spirit of the invention. I, therefore, do not wish to be limited to the precise method and ingredients set forth, but desire to avail myself of such variations and modifications as come within the scope of the appended claims.

Having described my invention, what I claim as new and desire to secure by Letters Patent is:—

1. The method of recovering metals from their ores, which consists in forming an anode of the ore, intermixed with a quantity of the pure metal; and then employing said anode as such in a suitable electrolyte, substantially as described.

2. The method of recovering metals from their ores, which consists in forming, by fusion, an anode of the ore, intermixed with a quantity of the pure metal; and then employing said anode as such in a suitable electrolyte, substantially as described.

3. The method of recovering metals from their ores, which consists in fusing a quantity of the metal with sodium carbonate; incorporating the same with a quantity of ore into an anode; and employing said anode as such in a suitable electrolyte, substantially as described.

4. The method of recovering metals from their ores, which consists in fusing a quantity of the metal with sodium carbonate; fusing the same with a quantity of the ore into an anode; and employing said anode as such in a suitable electrolyte, substantially as described.

5. The method of recovering metals from their ores, which consists in fusing a quantity of the metal covered by sodium carbonate; fusing the same with from ten to ninety per cent. of the ore into an anode; and employing said anode as such in a suitable electrolyte, substantially as described.

In testimony whereof I have signed my name to this specification in the presence of two subscribing witnesses.

DELL F. HARBAUGH.

Witnesses:
     JOSHUA R. H. POTTS,
     HELEN F. LILLIS.